United States Patent [19]

Lippmann

[11] 3,888,991
[45] June 10, 1975

[54] METHOD AND COMPOSITION FOR LOWERING INTRAOCULAR PRESSURE

[75] Inventor: Wilbur Lippmann, Montreal, Quebec, Canada

[73] Assignee: Ayerst McKenna and Harrison Ltd., Montreal, Canada

[22] Filed: Nov. 4, 1974

[21] Appl. No.: 520,397

Related U.S. Application Data

[63] Continuation-in-part of Ser. No. 392,898, Aug. 30, 1973, abandoned, which is a continuation of Ser. No. 198,993, Nov. 15, 1971, abandoned, which is a continuation of Ser. No. 878,581, Nov. 20, 1969, abandoned.

[52] U.S. Cl. ............... 424/285; 424/275; 424/330
[51] Int. Cl. ............................................ A61k 27/00
[58] Field of Search .......................... 424/285, 330

[56] References Cited
UNITED STATES PATENTS
3,523,124  8/1970  Peterson et al. .................... 424/285
3,644,647  2/1972  Langham ............................. 424/330

OTHER PUBLICATIONS
New Drugs, 1966 edition, AMA, pp. 327–330.
Chemical Abstracts, (1), 65:17531(g), (1966).
Chemical Abstracts (2), 66:3770q, (1967).
Chemical Abstracts (3), 66:65392m, (1967).
Chemical Abstracts (4), 68:1724(e), (1968).
Carlsson et al., Brit. J. Pharm, (1969), 36, pp.18–28.
Langham et al., J. Pharm & Exp. Therap., (1968), 163, No. 2, pp. 368–378.
Kitazawa et al., Nature, 219, (1969), pp. 1376–1378.

Primary Examiner—Albert T. Meyers
Assistant Examiner—Norman A. Drezin

[57] ABSTRACT

A method for lowering intraocular pressure by administering an effective amount of a compound of the formulae

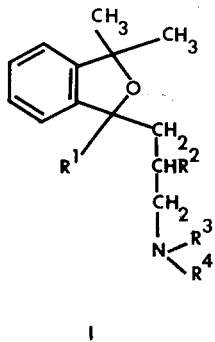 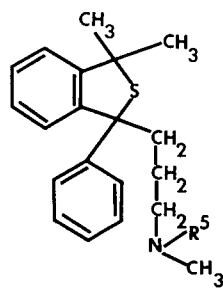 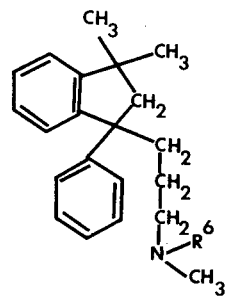

I  II  III in which $R^1$ represents the phenyl or the cyano group, and $R^2$, $R^3$, $R^4$, $R^5$ and $R^6$ represent hydrogen or methyl.

6 Claims, No Drawings

METHOD AND COMPOSITION FOR LOWERING INTRAOCULAR PRESSURE

This application is a continuation-in-part of application Ser. No. 392,898 filed Aug. 30, 1973, now abandoned, which is a continuation of application Ser. No. 198,993 filed Nov. 15, 1971, now abandoned, which is a continuation of application Ser. No. 878,581 filed Nov. 20, 1969, now abandoned.

BACKGROUND OF THE INVENTION

This invention relates to a method for lowering the intraocular pressure of the eye by decreasing the rate of aqueous humor formation, the inflow of aqueous humor and the resistance to outflow of aqueous humor of the eye. Since glaucomatous conditions are due to an increase in the amount of aqueous humor in the eyeball, raising intraocular pressure, my method is especially useful for the treatment of glaucoma.

Certain adrenergic amines, such as the natural catecholamines-epinephrine and norepinephrine- and synthetic amines like isoproterenol, have been shown to decrease the inflow of aqueous humor or the resistance to outflow and to decrease intraocular pressure when administered to experimental animals and man, see M. E. Langham and D. D. Carmel, J. Pharmacol. Exp. Therap., 163, 368 (1968) and references therein. In accord with these observations, epinephrine, usually in the form of its acid addition salt with pharmaceutically acceptable acids such as tartaric acid or hydrochloric acid, has been used widely for the treatment of chronic simple (open-angle) glaucoma. Other adrenergic amines such as isoproterenol, norepinephrine and ethylphenylephrine have been used less frequently for this purpose. However, when used alone, such drugs have the disadvantage of frequently inducing contact sensitivity and consequent ocular irritation. In addition, tearing and reactive hyperemia are relatively common. For example, a clinical study of the side effects of epinephrine has been reported by B. Becker and W. R. Morton, Amer. J. Ophthamol., 62, 272 (1966).

The present invention discloses a method for treating glaucoma by lowering intraocular pressure whereby the therapeutic effectiveness of epinephrine, or other similar adrenergic amines used for the treatment of glaucomatous conditions, may be achieved while substantially reducing the severity and frequency of side effects usually associated with such treatment.

SUMMARY OF THE INVENTION

I have found that the chemical compounds of the following formulae, either in their base form or in the form of their acid addition salts with pharmaceutically acceptable acids, are useful for lowering intraocular pressure. An important aspect of this new utility for these compounds and their acid addition salts is their potentiating effect of the pharmacologic action of epinephrine, or other adrenergic amines used for the treatment of glaucomatous conditions, on the eyeball.

The compounds, which potentiate the foregoing pharmacologic action, may be represented by the following formulae:

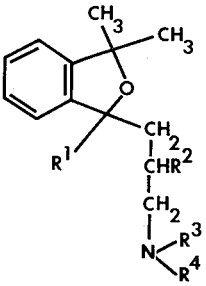 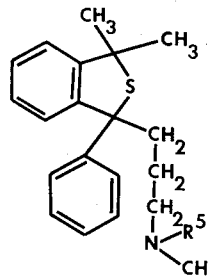 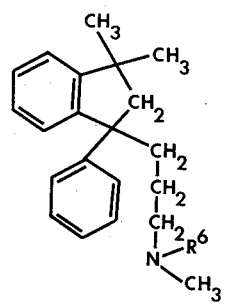

I        II        III in which $R^1$ represents the phenyl or the cyano group, and $R^2$, $R^3$, $R^4$, $R^5$ and $R^6$ represent hydrogen or methyl. The chemical names of the compounds represented by the above formulae are as shown below. Compounds of formula I are:

N,3,3-trimethyl-1-phenyl-1-phthalanpropylamine
N,N,3,3-tetramethyl-1-phenyl-1-phthalanpropylamine
1-cyano-N,3,3-trimethyl-1-phthalanpropylamine
1-cyano-N,N,3,3-tetramethyl-1-phthalanpropylamine
N,N,β,3,3-pentamethyl-1-phenyl-1-phthalanpropylamine
3,3-dimethyl-1-phenyl-1-phthalanpropylamine Compounds of formula II are:

N,3,3-trimethyl-1-phenyl-1-benzo[c]thiophenepropylamine
N,N,3,3-tetramethyl-1-phenyl-1-benzo[c]thiophenepropylamine Compounds of formula III are:

N,3,3-trimethyl-1-phenyl-1-indanpropylamine
N,N,3,3-tetramethyl-1-phenyl-1-indanpropylamine.

DETAILED DESCRIPTION OF THE INVENTION

The compounds of formula I have been described in a paper by P. V. Petersen et al., in Acta Pharmacol. et Toxicol. 24, 121 (1966), in Belgian Pat. No. 678,035, published Sept. 19, 1966, and in South African Pat. No. 67/1261, published July 31, 1967. Methods for their preparation are also disclosed in the above patents.

The compounds of formula II have been described by Carlsson et al. Brit. J. Pharmacol., 36, 18 (1969), and their methods of preparation are disclosed in Belgian Pat. No. 709,229, published July 11, 1968.

The compounds of formula III have been described in the paper by Petersen et al. cited above, and methods for their preparation are disclosed in Belgian Pat. No. 687,628, published Mar. 1, 1967 and in Netherlands Pat. No. 67,04297, published Sept. 29, 1967.

The acid addition salts of the above compounds of formulae I, II and III are prepared by reacting the base with either one equivalent or preferably an excess of the appropriate acid in an organic solvent, such as ether or an ethanol-ether mixture. These salts, when administered to mammals, possess the same activity as the base itself, in potentiating the effect of the adrenergic amine on the eyeball. For many purposes it is preferable to administer the salts rather than the base compound. Among the acid addition salts suitable for this purpose are salts such as the sulfate, phosphate, lactate, tartrate, maleate, citrate and hydrochloride. The hydrochloride salts are especially convenient. Both the base compounds themselves and the above acid addition salts have the distinct advantage of possessing a relatively low order of toxicity.

In practising the method of this invention for lowering the intraocular pressure of the eye, generally the most desirable results are obtained by administering one of the compounds listed above of formulae I, II or III or its addition salt with a pharmaceutically acceptable acid to mammals in conjunction with a less than usual therapeutic dose of a suitable adrenergic amine, preferably epinephrine. The dose of the adrenergic amine is administered topically to the eye according to manner used generally by physicians. The dose of the said compound of formulae I, II or III or its acid addition salt may be administered topically to the eye, orally or parenterally; the former method of administration being preferred. When the potentiating agent is given topically the desired therapeutic effect may be obtained by applying the potentiating agent during the interval of about one hour before to one hour after the application of epinephrine. However, for practical reasons, it is most convenient to administer simultaneously both the epinephrine and the agent.

Also included within the scope of this invention is the embodiment wherein the compounds listed above of formulae I, II or III or their addition salts with pharmaceutically acceptable acids are administered to animals without exogenously administered adrenergic amines. When administered in this manner the compounds of formulae I, II, or III and their acid addition salts effectively lower intraocular tension apparently by potentiating the endogenously released catecholamines. In this case, the therapeutic agent may be administered topically to the eye, orally or parenterally but again the topical application is preferred.

The compounds listed above of formulae I, II and III and their acid addition salts are soluble in a wide variety of pharmaceutically acceptable solvents and may readily be made up in solvents for topical and oral administration. They may also be prepared with suitable carriers to form tablets or capsules. Alternatively, they may be suspended in suitable suspending agents and administered in this form.

When the compounds of formulae I, II or III or their acid addition salts are prepared for topical administration to the eye, they may be dissolved in sterile aqueous opthalmic solutions, such as those described in "Remington's Practice of Pharmacy" by E. W. Martin and E. F. Cook, a well-known reference text in this field. Such solutions may contain the usual preservatives, pharmaceutical buffers or other usual ingredients. In addition, such solutions may also contain an amount of an adrenergic amine, described above, or a non-toxic salt thereof, preferably epinephrine or its acid addition salt with a pharmaceutically acceptable acid, in a concentration selected to provide the desired therapeutic response.

A typical composition for topical application, for example, may be a solution, containing 1 to 5 mg of the potentiating agent, i.e. one of the compounds listed above of formulae I, II or III or their acid addition salts, per millilitre of distilled water, rendered isotonic by the addition thereto of sodium chloride, together with the addition of phenyl mercuric acetate, 0.02 mg/ml, as a preservative. Furthermore, 1 to 10, preferably 1 to 5 mg/ml of epinephrine or a suitable addition salt thereof may be incorporated into this formulation to provide a suitable preparation for the lowering of intraocular pressure.

The compositions for topical application, such as those described above, are applied dropwise to the eye with the frequency of instillation being individualized, usually from once daily to eight times daily or according to instructions of a physician.

The ingredients of the above compositions may be compounded as ophthalmic ointments. For example, the finely milled powdered ingredients of the above compositions without the solvent are mixed with white petrolatum until a uniform distribution and desired dosage form is obtained. Such ointments are applied to the eye as required or as directed by a physician.

When the compounds listed above of formulae I, II or III or their acid addition salts with pharmaceutically acceptable acids are prepared for oral administration, they may, for example, be incorporated with the usual excipients or carriers, such as lactose, starch or sucrose, in the form of capsules or tablets containing from 10 – 50 mg of the active ingredient per capsule or tablet. These pharmaceutical preparations may contain the usual coloring agents, preservatives or other usual ingredients. When liquid preparations are preferred for oral ingestion, the compounds or their acid addition salts, described above, may be dissolved or suspended in a suitable nontoxic carrier, such as, distilled water aqueous alcohol, or a pharmaceutically acceptable oil. The concentration of the active agent is selected to provide a generally useful composition.

A typical composition for oral ingestion, for example, may be a solution, containing 20 to 50 mg of N,3,3-trimethyl-1-phenyl-1-phthalanpropylamine hydrochloride or N,3,3-trimethyl-1-phenyl-1-thiophthalanpropylamine hydrochloride per millilitre of distilled water, rendered isotonic by the addition thereto of sodium chloride, sodium citrate or glucose.

Such solutions or suspensions may also contain the usual preservatives, sweetening agents, and other agents which are present in conventional liquid pharmaceutical preparations.

For parenteral administration, the above compounds of formulae I, II or III or their acid addition salts with pharmaceutically acceptable acids may be dissolved or suspended in suitable sterile liquid carriers such as distilled water or oils of synthetic, animal, petroleum or vegetable origin, for example, soybean oil, sesame oil, mineral oil or propylene glycol. The usual preservatives and other ingredients used for pharmaceutical preparations for parenteral dose may also be incorporated. The concentration of the active agent in these preparations for parenteral use is selected to provide a generally useful composition. A typical composition would ordinarily constitute from about 2 to 5% by weight, of N,3,-3-trimethyl-1-phenyl-1-phthalanpropylamine hydrochloride or of N,3,3-trimethyl-1-phenyl-1-benzo[c]thiophenepropylamine hydrochloride in sesame oil with 1.5% benzyl alcohol as a preservative.

When utilizing the above compounds listed above of formulae I, II or III or their suitable acid addition salts in oral or parenteral preparations for lowering intraocular tension the daily dose of these active ingredients may range from approximately 0.2 mg per kilogram of body weight to 2 mg per kilogram of body weight. Generally, a parenteral dose is administered once a day, whereas the daily oral dose is administered in three or four applications.

The ability of the compounds listed above of formulae I, II and III and their acid addition salts with pharmaceutically acceptable acids to potentiate the action of endogenous or exogenously applied adrenergic amines on the eye may be demonstrated by standard pharmacologic tests such as those described by Langham and Carmel, cited above. The tests in laboratory animals, described by these authors, were used successfully to eventually discover the clinical effectiveness of protriptyline in lowering intraocular pressure.

The experimental approach used by Langham and Carmel to evaluate the clinical effectiveness of protriptyline was based on the observation that certain tricyclic antidepressants potentiate the peripheral actions of catecholamines such as norepinephrine and epinephrine. Protriptyline had been shown previously to have this action. Subsequent tests carried out in rabbits and in primates demonstrated that administration of protriptyline, either topically or systemically, increased the sensitivity and duration of response of the iris and intraocular pressure to epinephrine and norepinephrine. The validity of the approach was realized fully when the subsequent clinical studies with this drug demonstrated its ability to induce pupil dilation and to diminish intraocular pressure, associated with an increase in outflow facility and a decrease in the rate of formation of the aqueous humor.

The compounds of this invention of formulae I, II and III have been reported to potentiate the peripheral actions of catecholamines; see for example, A. Carlsson et al., cited above. Although these compounds are not classified as tricyclic antidepressants, their pharmacological profiles show many, but not all, of the properties of the antidepressants and, in addition, they have a markedly lower degree of anticholinergic action. This lack of anticholinergic activity is an outstanding characteristic and is very much desired for drugs used for the treatment of glaucomatous conditions.

My present invention discloses that the compounds listed above of formulae I, II or III in which $R^1$, $R^2$, $R^3$, $R^4$, $R^5$ and $R^6$ are as defined above or their acid addition salts with pharmaceutically acceptable acids, despite their structural and pharmacological differences from protriptyline, are able to potentiate the action of adrenergic amines on the eye and provides suitable methods for applying this effect for lowering intraocular pressure.

Furthermore, this desirable effect of the compounds of formulae I, II and III and their acid addition salts may be readily demonstrated in pharmacological tests such as those described by Langham and Carmel, cited above.

For example, it may be demonstrated that rabbits pretreated with 50 μl. of a 0.2, 0.1 or 0.05% solution of N,3,3-trimethyl-1-phenyl-1-phthalanpropylamine hydrochloride, applied topically to the eye three times at one-half hour intervals prior to treatment with epinephrine bitartrate (50 μl. of 0.1% solution, two times at one-half hour intervals) causes pupil dilation which is maximal after the first treatment with epinephrine bitartrate. Control animals, receiving no pretreatment with the above agent, do not elicit this response under these conditions.

The following Examples will illustrate further this invention.

EXAMPLE 1

The percentages in this Example of compositions for topical use refer to a percent weight by volume a)  Sterile vehicle containing                                    Percent
    N,3,3-trimethyl-1-phenyl-1-phthalan-
    propylamine hydrochloride                                     0.1
    chlorbutanol                                                  0.5
    sodium bisulfite                                              0.3
    boric acid                                                    0.8
    sodium borate                                                 0.6
    water, q.s. ad.
b)  Sterile vehicle containing                                    Percent
    N,3,3-trimethyl-1-phenyl-1-phthalan-
    propylamine hydrochloride                                     0.1
    phenyl mercuric acetate                                       0.002
    sodium bisulfite                                              0.3
    sodium hydroxide or hydrochloric
    acid to pH                                                    5–7
    water, q.s. ad.
c)  A sterile vehicle containing the same ingredients
    in the same amounts as described in composition(a)
    of this Example plus levorotatory epinephrine
    bitartrate (0.2%, equivalent to 0.11% base).
d)  A sterile vehicle containing the same ingredients
    in the same amounts as described in composition(b)
    of this Example plus levorotatory epinephrine
    bitartrate (0.2%, equivalent to 0.11% base).
e)  A solution for pharmacologic purposes containing
    N,3,3-trimethyl-1-phenyl-1-phthalanpropylamine
    hydrochloride (0.05%, 0.1% or 0.2%) in distilled
    water, q.s. ad.

In the foregoing compositions (a) to (d) of this Example, the antioxidant, sodium bisulfite, may be varied in concentration from 0.3 to 0.03 per cent. The preservatives chlorbutanol and phenyl mercuric acetate, as well as the antioxidant, may be replaced by any preservative or antioxidant suitable for ophthalmic use. Such preservatives and antioxidants are described in "Remington's Practice of Pharmacy," cited above. Other suitable buffers, in place of sodium hydroxide and hydrochloric acid, and boric acid and sodium borate used above, may be substituted. Such suitable buffers are described also in the foregoing text.

Similar compositions for topical use may be prepared containing any of the other compounds listed above of formulae I, II or III in which $R^1$, $R^2$, $R^3$, $R^4$, $R^5$ and $R^6$ are as defined above or their acid addition salts with pharmaceutically acceptable acids.

EXAMPLE 2 a. N,3,3-Trimethyl-1-phenyl-1-phthalanpropylamine hydrochloride or N,3,3-trimethyl-1-phenyl-1-benzo[c]thiophenepropylamine hydrochloride (20 g) is dissolved in 980 ml of distilled water, the solution is made isotonic by addition of sodium chloride or sodium citrate or glucose, a preservative such as 0.1 percent weight by volume of Methylparaban and 0.015 percent weight by volume of Propylparaban or 0.5 percent weight by volume of chlorbutanol is added, the solution is made up to 1,000 ml with distilled water, sterilized by autoclaving or sterile filtration, and filled into 2 ml ampoules or vials, to make a solution for parenteral administration containing 20 mg/ml of the active ingredient.

b. In the same manner, but using 50 g of N,3,3-trimethyl-1-phenyl-1-benzo[c]thiophenepropylamine hydrochloride, a solution for parenteral administration containing 50 mg/ml of the active ingredient is obtained and is filled into 20 ml ampoules or vials.

c. N,3,3-Trimethyl-1-phenyl-1-phthalanpropylamine hydrochloride or N,3,3-trimethyl-1-phenyl-1-benzo[c]thiophenepropylamine hydrochloride (20 g) is suspended in 965 g of sesame oil and 15 g of benzyl alcohol by means of a mechanical blender. The suspension is filled into 2 ml ampoules or vials. After autoclaving, a suspension containing 2% of the active ingredient by weight is obtained for parenteral administration.

d. Again in the same manner, but using 0.225 g, 0.45 g, 2.5 g, 5.0 g, or 10.0 g of N,3,3-trimethyl-1-phenyl-1-phthalanpropylamine hydrochloride or of N,3,3-trimethyl-1-phenyl-1-benzo[c]thiophenepropylamine hydrochloride alone, without additives or preservatives, solutions for parenteral or oral administration for pharmacological purposes containing 0.225 mg/ml, 0.45 mg/ml, 2.5 mg/ml, 5.0 mg/ml, and 10.0 mg/ml of the active ingredient are obtained, respectively.

Similar solutions or suspensions are also prepared with any of the other compounds listed above of formulae I, II, or III in which $R^1$, $R^2$, $R^3$, $R^4$, $R^5$ and $R^6$ are as defined above or their acid addition salts with pharmaceutically acceptable acids.

EXAMPLE 3 a. N,3,3-Trimethyl-1-phenyl-1-phthalanpropylamine hydrochloride or N,3,3-trimethyl-1-phenyl-1-benzo[c]thiophenepropylamine hydrochloride (50 g) is mixed with 150 grams lactone, 44 grams starch, 4 grams magnesium stearate and 2 grams sucrose. The mixture is granulated with addition of a small amount of water, dried and compressed into tablets weighing 250 mg each, to make 1,000 tablets containing 50 mg each of the active ingredient.

b. In the same manner, but using 10 g of N,3,3-trimethyl-1-phenyl-1-phthalanpropylamine hydrochloride or N,3,3-trimethyl-1-phenyl-1-benzo[c]thiophenepropylamine hydrochloride, 190 g lactose, 44 g starch, 4 g magnesium stearate, and 2 g sucrose, there are obtained 1000 tablets of 250 mg weight each, such tablets containing 10 mg each of the active ingredient.

c. Again in the same manner, but using 25 g of N,3,3-trimethyl-1-phenyl-1-phthalanpropylamine hydrochloride or N,3,3-trimethyl-1-phenyl-1-benzo[c]thiophenepropylamine hydrochloride, 175 g lactose, 44 g starch, 4 g magnesium stearate, and 2 g of sucrose, there are obtained 1,000 tablets of 250 mg weight each, such tablets containing 25 mg each of the active ingredient.

Similar tablets are also prepared containing any of the other compounds listed above of formulae I, II, or III in which $R^1$, $R^2$, $R^3$, $R^4$, $R^5$ and $R^6$ are as defined above or their acid addition salts with pharmaceutically acceptable acids.

EXAMPLE 4

The potentiating effect of N,3,3-trimethyl-1-phenyl-1-phthalanpropylamine hydrochloride on the pharmacologic action of epinephrine bitartrate on the eye is demonstrable in the following modified method of Langham and Carmel, cited above.

Twenty-four albino rabbits, divided into four groups of six, are used for this test. On the first day of investigation the animals receive one of the following treatments in their right eyes: (1) epinephrine bitartrate at the concentration of 0.1%, (2) epinephrine bitartrate at the concentration of 1%, (3) N,3,3-trimethyl-1-phenyl-1-phthalanpropylamine hydrochloride at the concentration of 0.2% and (4) protriptyline hydrochloride at the concentration of 0.2%. After a 48 hour rest the left eye of the same animals are used for the investigation of 0.1 and 0.05% solutions of the latter two compounds. The solutions of N,3,3-trimethyl-1-phenyl-1-phthalanpropylamine hydrochloride are prepared according to the procedures described in Example 1 (e); the solutions of protriptyline hydrochloride are prepared by using distilled water and serve as a standard. One drop of the test solution is instilled at each time into the conjunctival sac. Half an hour later both eyes are observed for pupillary size and another drop of solution is instilled in the eye. The animals are treated a maximum of five times. One half of the animals receiving N,3,3-trimethyl-1-phenyl-1-phthalanpropylamine hydrochloride or protriptyline hydrochloride are treated, at the fourth and/or fifth treatments, with 0.1% solution of epinephrine bitartrate.

The eyes are checked for mydriasis with a microscopic lamp (6 Volts-15 Watts) by placing it 1 foot away from the eye. When the iris is maximally contracted (for the intensity of light), one measurement of the pupil size from canthus to canthus is taken. The diameter of the normal pupil is 2 mm, and a diameter of 10 mm is recorded for complete mydriasis (very minor or no contraction of the iris under the beam of light).

The results obtained by treating rabbits according to the above procedure are reported in the Tables 1, 2 and 3, below.

The 1% solution of epinephrine bitartrate elicits some mydriasis at the first instillation; after repeated treatments maximal mydriasis (8–10 mm) is achieved in four rabbits. The 0.1% solution, however, starts to show some mydriasis only after repeated instillation; maximal mydriasis is achieved after repeated treatments in one rabbit only and the remainder of the group show only very mild mydriasis (Table I).

N,3,3-trimethyl-1-phenyl-1-phthalanpropylamine hydrochloride and protriptyline hydrochloride elicit some mydriasis after the second to third treatment. This mydriasis is always relatively mild. However, most of the rabbits show maximal or very marked mydriasis (8–10 mm) after a drop of 0.1% epinephrine is instilled (fourth treatment) (Tables 2 and 3). N,3,3-trimethyl-1-phenyl-1-phthalanpropylamine hydrochloride appears to be more potent than protriptyline hydrochloride.

Using the same experimental procedure described above, it may be shown that the administration of the remaining preparations described in Example 1 potentiate the pharmacologic action of epinephrine bitartrate on the eye.

Similar results are also obtained when similar dosages of N,3,3-trimethyl-1-phenyl-1-benzo[c]thiophenepropylamine hydrochloride or any of the other compounds listed above of formulae I, II or III in which $R^1$, $R^2$, $R^3$, $R^4$, $R^5$ and $R^6$ are as defined above or their acid addition salts with pharmaceutically acceptable acids are used.

EXAMPLE 5

Local eye irritation is studied following the instillation of two drops of a solution into the conjunctival sac. Three albino rabbits are used for each solution and the instillations are done twice a day for three days.

The following solutions are used:

1. N,3,3-trimethyl-1-phenyl-1-phthalanpropylamine hydrochloride at 1 and 2% concentrations in distilled water.

2. protriptyline hydrochloride at 2% concentration in distilled water.

The 1% solution of N,3,3-trimethyl-1-phenyl-1-phthalanpropylamine hydrochloride does not elicit any irritation when instilled into the conjunctival sac. The 2% solution of this compound elicits a mild congestion of the conjunctiva and iris which decreases in the second day and disappears by the third day.

The 2% solution of protriptyline hydrochloride elicits a severe congestion of the conjunctiva and of the iris and chemosis of the nictitating membrane in particular. The treatment with this compound is stopped after the first day.

Similar results regarding eye irritation to the above investigation with solutions of N,3,3-trimethyl-1-phenyl-1-phthalanpropylamine hydrochloride are obtained when similar dosages of N,3,3-trimethyl-1-phenyl-1-benzo[c]thiophenepropylamine hydrochloride or any of the other compounds listed above of formulae I, II or III in which $R^1$, $R^2$, $R^3$, $R^4$, $R^5$ and $R^6$ are as defined above or their acid addition salts with pharmaceutically acceptable acids are used.

TABLE 1

The effect of epinephrine bitartrate in rabbit eye applied topically

Treatment (Tr.) and pupil diameter (P) in mm.

| Rabbit No. | 1 Tr. | p | 2 Tr. | P | 3 Tr. | P | 4 Tr. | P | 5 Tr. | P |
|---|---|---|---|---|---|---|---|---|---|---|
| 1 | A | 2 | A | 3 | A | 9 | O | 10 | O | 10 |
| 2 | A | 2 | A | 3 | A | 3 | A | 3 | A | 3 |
| 3 | A | 2 | A | 3 | A | 4 | A | 5 | A | 5 |
| 4 | A | 2 | A | 3 | A | 3 | A | 4 | A | 3 |
| 5 | A | 2 | A | 2 | A | 3 | A | 3 | A | 3 |
| 6 | A | 2 | A | 2 | A | 3 | A | 3 | A | 3 |
| 7 | B | 6 | B | 8 | B | 8 | B | 7 | B | 9 |
| 8 | B | 8 | B | 8 | B | 7 | B | 8 | B | 8 |
| 9 | B | 3 | B | 4 | B | 5 | B | 9 | B | 7 |
| 10 | B | 4 | B | 8 | B | 9 | B | 10 | B | 8 |
| 11 | B | 7 | B | 8 | B | 9 | B | 10 | B | 8 |
| 12 | B | 3 | B | 4 | B | 5 | B | 9 | B | 3 |

A Epinephrine bitartrate 0.1%
B Epinephrine bitartrate 1%
O No treatment

TABLE 2

The effect of N,3,3-trimethyl-1-phenyl-1-phthalanpropylamine hydrochloride in rabbit eye applied topically Treatment (Tr.) and pupil diameter (P) in mm.

| Rabbit No. | 1 Tr. | P | 2 Tr. | P | 3 Tr. | P | 4 Tr. | P | 5 Tr. | P |
|---|---|---|---|---|---|---|---|---|---|---|
| 13 | C | 2 | C | 2 | C | 3 | C | 2 | C | 3 |
| 14 | C | 2 | C | 2 | C | 2 | C | 3 | C | 4 |
| 15 | C | 2 | C | 2 | C | 4 | C | 3 | C | 5 |
| 16 | C | 3 | C | 4 | C | 4 | A | 10 | O | 10 |
| 17 | C | 2 | C | 2 | C | 2 | A | 10 | O | 10 |
| 18 | C | 3 | C | 4 | C | 4 | A | 10 | O | 10 |
| 1 | E | 2 | E | 2 | E | 4 | E | 3 | E | 5 |
| 2 | E | 2 | E | 2 | E | 3 | E | 3 | E | 5 |
| 3 | E | 2 | E | 2 | E | 3 | E | 4 | E | 4 |
| 4 | E | 2 | E | 2 | E | 4 | A | 10 | A | 10 |
| 5 | E | 2 | E | 2 | E | 3 | A | 5 | A | 7 |
| 6 | E | 2 | E | 2 | E | 4 | A | 10 | A | 8 |
| 13 | G | 2 | G | 2 | G | 3 | G | 3 | G | 3 |
| 14 | G | 2 | G | 2 | G | 3 | G | 3 | G | 4 |
| 15 | G | 2 | G | 2 | G | 3 | G | 4 | G | 4 |
| 16 | G | 2 | G | 2 | G | 3 | A | 8 | A | 10 |
| 17 | G | 2 | G | 2 | G | 3 | A | 9 | A | 10 |
| 18 | G | 2 | G | 2 | G | 2 | A | 8 | A | 9 |

C N,3,3-trimethyl-1-phenyl-1-phthalanpropylamine hydrochloride 0.2%
E N,3,3-trimethyl-1-phenyl-1-phthalanpropylamine hydrochloride 0.1%
G N,3,3-trimethyl-1-phenyl-1-phthalanpropylamine hydrochloride 0.05%
O No treatment
A Epinephrine bitartrate 0.1%

TABLE 3

The effect of protriptyline hydrochloride in rabbit eye applied topically

Treatment (Tr.) and pupil diameter (P) in mm.

| Rabbit No. | 1 Tr. | P | 2 Tr. | P | 3 Tr. | P | 4 Tr. | P | 5 Tr. | P |
|---|---|---|---|---|---|---|---|---|---|---|
| 19 | D | 2 | D | 4 | D | 5 | D | 6 | D | 6 |
| 20 | D | 2 | D | 2 | D | 3 | D | 3 | D | 4 |

TABLE 3 — Continued

The effect of protriptyline hydrochloride in rabbit eye applied topically

Treatment (Tr.) and pupil diameter (P) in mm.

| Rabbit No. | 1 Tr. | P | 2 Tr. | P | 3 Tr. | P | 4 Tr. | P | 5 Tr. | P |
|---|---|---|---|---|---|---|---|---|---|---|
| 21 | D | 2 | D | 4 | D | 5 | D | 6 | D | 8 |
| 22 | D | 2 | D | 3 | D | 4 | A | 10 | O | 10 |
| 23 | D | 2 | D | 2 | D | 2 | A | 5 | A | 7 |
| 24 | D | 2 | D | 3 | D | 5 | A | 10 | O | 10 |
| 7  | F | 2 | F | 2 | F | 4 | F | 4 | F | 4 |
| 8  | F | 2 | F | 2 | F | 4 | F | 4 | F | 4 |
| 9  | F | 2 | F | 2 | F | 4 | F | 4 | F | 4 |
| 10 | F | 2 | F | 2 | F | 5 | A | 7 | A | 9 |
| 11 | F | 2 | F | 2 | F | 5 | A | 8 | A | 9 |
| 12 | F | 2 | F | 2 | F | 4 | A | 10 | A | 10 |
| 19 | H | 2 | H | 2 | H | 5 | H | 5 | H | 5 |
| 20 | H | 2 | H | 2 | H | 3 | H | 4 | H | 4 |
| 21 | H | 2 | H | 2 | H | 4 | H | 4 | H | 5 |
| 22 | H | 2 | H | 2 | H | 3 | A | 5 | A | 10 |
| 23 | H | 2 | H | 2 | H | 2 | A | 4 | A | 6 |
| 24 | H | 2 | H | 2 | H | 3 | A | 5 | A | 9 |

D Protriptyline hydrochloride 0.2%
F Protriptyline hydrochoride 0.1%
H Protriptyline hydrochloride 0.05%
O No treatment
A Epinephrine bitartrate 0.1%

I claim:

1. The method of lowering intraocular pressure which comprises administering topically to the eye of a person suffering from an open-angle glaucomatous condition an intraocular pressure lowering amount of an isotonic aqueous solution containing about 1 to 10 milligrams per milliliter, as the base, of epinephrine or an acid addition salt of epinephrine with a pharmaceutically acceptable acid, in conjunction with a potentiating amount of 1 to 5 milligrams per milliliter, as the base, of N,3,3-trimethyl-1-phenyl-1-phthalanpropylamine or of its acid addition salt with a pharmaceutically acceptable acid.

2. The method of claim 1 wherein said salt of epinephrine is 1-epinephrine bitartrate.

3. A pharmaceutical composition for lowering intraocular pressure consisting essentially of an isotonic aqueous solution containing about 1 to 10 milligrams per milliliter, as the base, of epinephrine or an acid addition salt of epinephrine with a pharmaceutically acceptable acid, and a potentiating amount of 1 to 5 milligrams per milliliter, as the base, of N,3,3-trimethyl-1-phenyl-1-phthalanpropylamine or of its acid addition salt with a pharmaceutically acceptable acid.

4. The composition of claim 3 wherein said salt of epinephrine is 1-epinephrine bitartrate.

5. The method of lowering intraocular pressure which comprises administering topically to the eye of a person suffering from an open-angle glaucomatous condition an intraocular pressure lowering amount of an isotonic aqueous solution containing about 1 to 5 milligrams per milliliter, as the base, of epinephrine or an acid addition salt of epinephrine with a pharmaceutically acceptable acid, in conjunction with a potentiating amount of 1 to 5 milligrams per milliliter, as the base, of N,3,3-trimethyl-1-phenyl-1-phthalanpropylamine or of its acid addition salt with a pharmaceutically acceptable acid.

6. A pharmaceutical composition for lowering intraocular pressure consisting essentially of an isotonic aqueous solution containing about 1 to 5 milligrams per milliliter, as the base, of epinephrine or an acid addition salt of epinephrine with a pharmaceutically acceptable acid, and a potentiating amount of 1 to 5 milligrams per milliliter, as the base, of N,3,3-trimethyl-1-phenyl-1-phthalanpropylamine or of its acid addition salt with a pharmaceutically acceptable acid.

* * * * *